Patented Mar. 31, 1925.

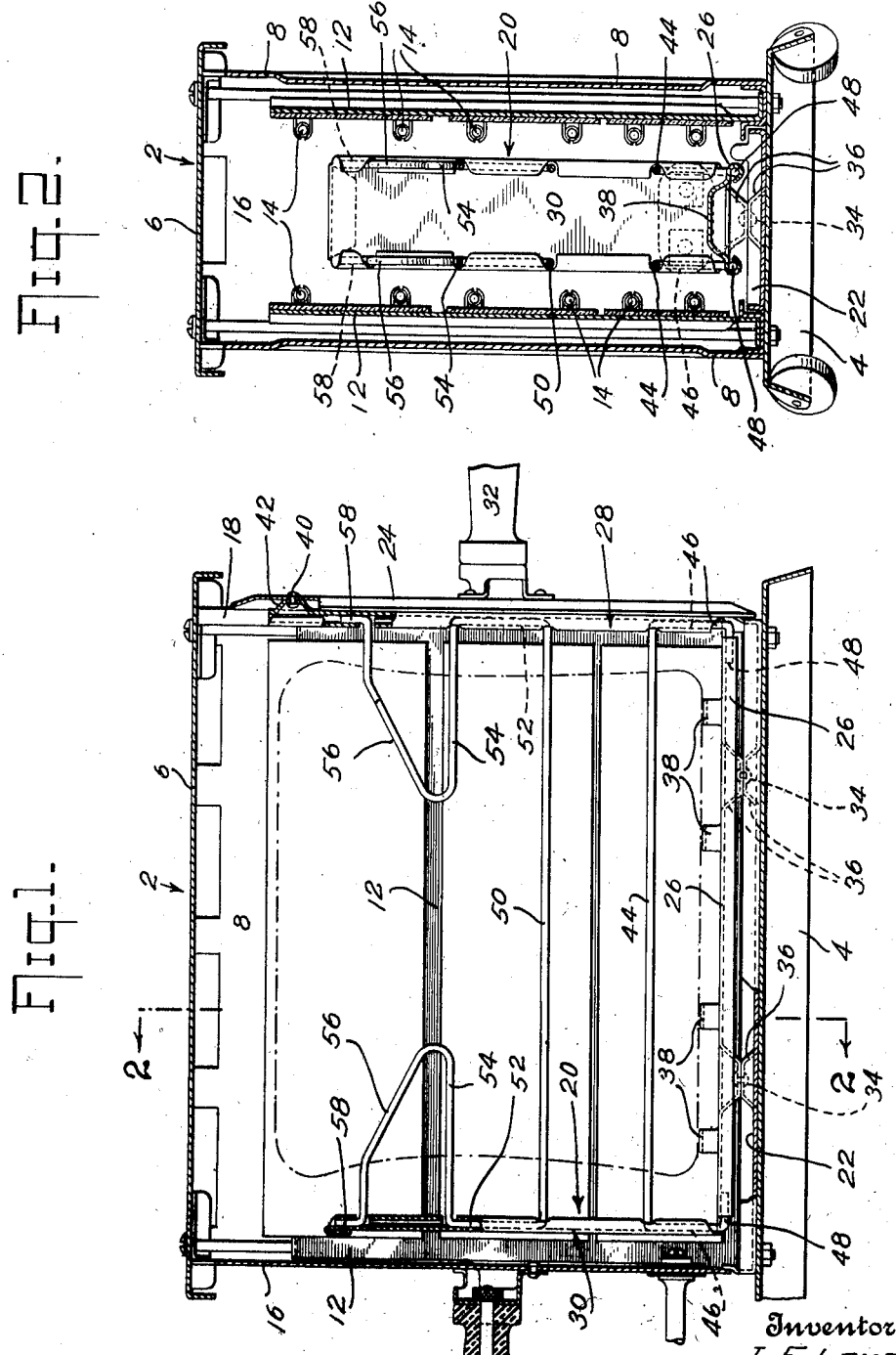

1,532,104

UNITED STATES PATENT OFFICE.

JOSEPH F. LAMB AND ALONZO A. WARNER, OF NEW BRITAIN, CONNECTICUT, ASSIGNORS TO LANDERS, FRARY & CLARK, OF NEW BRITAIN, CONNECTICUT, A CORPORATION OF CONNECTICUT.

ELECTRIC TOASTER.

Application filed August 25, 1923. Serial No. 659,248.

*To all whom it may concern:*

Be it known that we, JOSEPH F. LAMB and ALONZO A. WARNER, citizens of the United States, both residing at New Britain, county of Hartford, State of Connecticut, have invented a certain new and useful Improvement in Electric Toasters, of which the following is a full, clear, and exact description.

Our invention relates to electric toasters, and has special reference to electric toasters of the oven type having a heat retaining casing and a toast holding rack arranged within the casing.

An object of the invention is to provide a toaster of this character having means for effecting a circulation of heat and air about the toast in a novel and improved manner, whereby more uniform results are secured.

Another object of the invention is to provide a toast holding rack of novel and improved construction for a toaster of the type above indicated.

The following is a description of our invention, reference being had to the accompanying drawings, in which, Figure 1 is a longitudinal sectional view, partly in elevation, with parts broken away and with the heating elements removed, of an electric toaster of the oven type embodying the features of the invention in their preferred form; and Fig. 2 is a vertical sectional view taken on the line 2—2, of Fig. 1.

The toaster illustrated in the drawings is provided with a heat retaining casing or housing 2 having a base 4, a top 6, side walls 8, supporting plates 12 spaced from the side walls, respectively, heating coils 14 mounted on said supporting plates, and end walls 16, one of which is provided with a door opening 18, the construction being similar to that illustrated and described in Patent No. 1,480,084, granted to J. F. Lamb, January 8, 1924.

The toaster is further provided with a toast holding rack 20 having a base 22 in the form of a tray which is mounted to slide longitudinally on the base 4 in and out through the door opening 18. A vertically arranged closure plate 24 is secured at its lower end to the forward end of the base or tray 22 and is adapted to overlap portions of an end wall 16 adjacent the vertical edges of the door opening 18 when the rack is fully inserted so as to close the opening except for a small space at the top. The rack is further provided with a toast support 26 which is secured to and spaced from the bottom wall of the base or tray 22, vertical front and rear end walls 28 and 30, respectively, and sides of wire between which the toast is placed. A handle 32 is secured to the closure plate 24 for moving the rack in and out. The toast support 26 is formed of sheet metal and is secured to the tray 22 which is also formed of sheet metal, by means of rivets 34, the support 26 and the bottom wall of the tray having projecting portions 36 through which the rivets extend so as to space the support from the bottom of the tray.

In the illustrated construction the support 26 is provided with four struck up portions 38 that are spaced apart, relatively narrow and extend transversely thereof with their top surfaces arranged in a horizontal plane. These struck up portions 38 are for the purpose of supporting the toast at a plurality of points along its bottom edge so as to provide spaces between the lower edge of the toast and said support 26. By the provision of four of these transversely struck up portions 38, proper supporting of the toast a distance above the body of the support 26 is insured, as the two intermediate struck up portions will serve to support the smaller slices of toast and all four struck up portions will serve to support the larger slices of toast and it will be apparent that such arrangement will take care of any unevenness of the lower edge of the toast. It has been found that by thus supporting the toast a distance above the body of the support, more uniform results are secured than if the lower edge of the toast rested flat upon the body of the support as heretofore, for the reason that the spaces between the lower edge of the toast and said support permit the heat and air to circulate therethrough and give a more uniform heat to the lower edge and both sides of the toast throughout their extent, and this is true for both small and large slices of toast irrespective of any unevenness in their lower edges, as above indicated. Also, by spacing the support 26 above the bottom of the tray 22, heat and air is permitted to circulate through the space between them.

In the illustrated construction the toast support 26 and the front and rear ends 28 and 30 of the toast holding rack form the horizontal portion and the vertical portions, respectively, of a U-shaped member. The front end 28 of the rack is arranged adjacent the closure plate 24 and is secured to the closure plate by means of a rivet 40, the end 28 having a convex portion 42 so as to space it from the closure plate. This U-shaped member is made of a strip of sheet metal with the longitudinal edges of the horizontal portion or toast support 26 thereof turned downwardly and inwardly, and the longitudinal edges of the vertical portions or front and rear ends 28 and 30 turned inwardly, so as to form tubular beads on both longitudinal edges thereof. The vertical sides of the rack above referred to are each formed by a wire 44 having a horizontal portion that extends between the ends 28 and 30 and spaced a distance above the support 26; downwardly extending vertical portions 46 that are embraced by the inwardly turned edges of the ends 28 and 30; and inwardly turned horizontal end portions 48 that are embraced by the downwardly and inwardly turned edges of the support 26. Each vertical side of the rack is further made up of a wire 50 having a horizontal portion spaced a distance above said horizontal portion of the wire 44 and extending between said ends 28 and 30; upwardly extending portions 52 that are embraced by the inwardly turned edges of the ends 28 and 30; horizontal portions 54 that extend inwardly a distance toward each other and then are bent upwardly and outwardly to said ends 28 and 30, respectively, so as to form loop portions 56; and upwardly extending end portions 58 that are embraced by the inwardly turned edges of the ends 28 and 30.

With this construction it will be apparent that a simple, strong and durable toast holding rack is provided, the ends and toast support 26 of the rack being made up of a single strip of sheet metal which is effectively reenforced by its turned over or beaded edges, and each side of the rack being made up of but two wires that are securely held by the beaded edges of said U-shaped member, thus dispensing with soldering or brazing of the wires to said members. The arrangement of the loops 56 is such as to enable the fingers of the user when the rack is withdrawn, to be passed between them to grasp the toast without danger of coming in contact with the heated parts of the rack.

As will be evident to those skilled in the art our invention permits of various modifications without departing from the spirit thereof or the scope of the appended claims.

What we claim is:

1. A toaster having a heat retaining casing, and a toast holding rack mounted within the casing comprising sides vertically arranged and spaced apart between which the toast is placed, and a support having a plurality of upward projections spaced apart on which the lower edge of the toast rests with the ends of the toast extending a distance beyond the projections, so as to provide spaces between said lower edge and said support.

2. A toaster having a heat retaining casing, and a toast holding rack mounted within the casing comprising sides vertically arranged and spaced apart between which the toast is placed, and a support having a plurality of narrow upward projections transversely arranged and spaced apart upon which the lower edge of the toast rests so as to provide spaces between said lower edge and said support, and a slide for the rack over which said support extends and from which it is spaced so as to permit a circulation of air beneath the support.

3. A toaster having a toast holding rack comprising sides vertically arranged and spaced apart between which the toast is placed, and a support of sheet metal having a plurality of struck-up portions transversely arranged and spaced apart on which the lower edge of the toast rests so as to provide spaces between said lower edge and said support.

4. A toaster having a toast holding rack comprising a member having vertical portions of sheet metal forming the front and rear end walls of the rack and having their longitudinal edges turned inwardly, longitudinally extending sides for the rack spaced apart between which the toast is placed, each side comprising a wire having a horizontal portion extending between said vertical portions of said member, loop-like portions arranged above said horizontal portion projecting toward each other from said vertical portions of said member and having their inner ends spaced a distance apart to enable the fingers of the user to be placed between them to grasp the toast, the portions of said wire extending between said horizontal portions and said loop portions and the ends of the wire being held by said inwardly turned edges of said vertical portions of said member.

5. A toaster having a toast holding rack comprising a U-shaped member of sheet metal having the longitudinal edges of its vertical sides turned inwardly and the longitudinal edges of its base turned downwardly and inwardly, and sides for the rack between which the toast is placed, each comprising a wire having a horizontal portion extending between the vertical sides of said U-shaped member, downwardly extending vertical portions held by said inwardly turned edges of the vertical sides of said U-shaped member, and inwardly turned horizontal end portions held by the downwardly and inwardly turned edges of the base portion of said U-shaped member.

JOSEPH F. LAMB.
ALONZO A. WARNER.